No. 652,236. Patented June 19, 1900.
G. B. FLETCHER.
SPRING WHEEL FOR VEHICLES.
(Application filed Feb. 5, 1900.)
(No Model.)
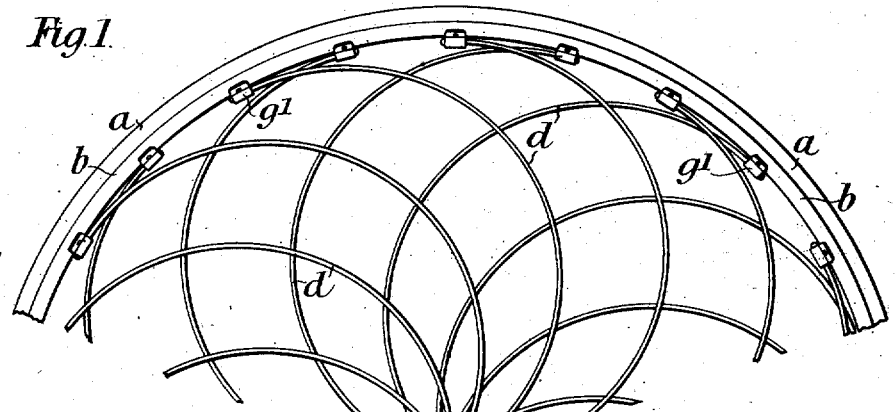
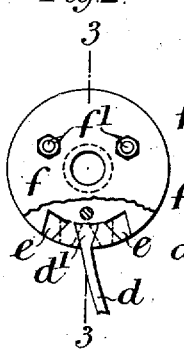
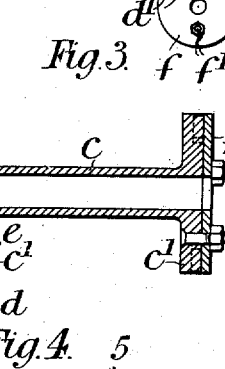
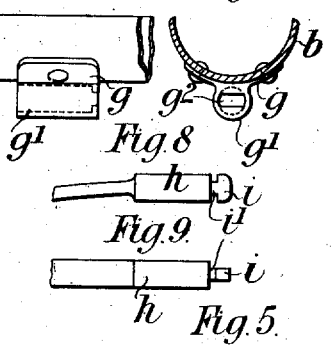
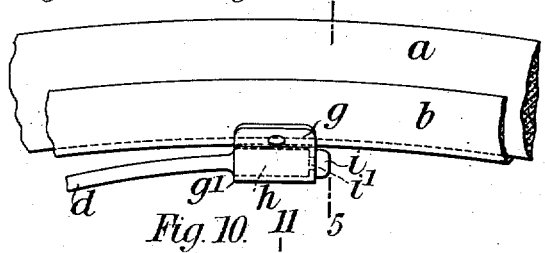
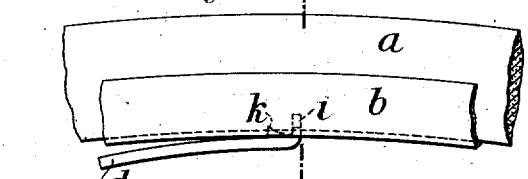
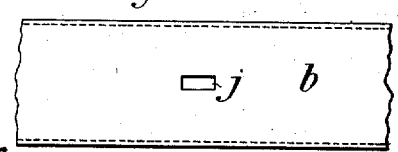
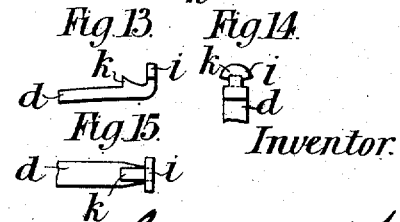
Witnesses
Inventor

UNITED STATES PATENT OFFICE.

GEORGE BALLETT FLETCHER, OF LONDON, ENGLAND.

SPRING-WHEEL FOR VEHICLES.

SPECIFICATION forming part of Letters Patent No. 652,236, dated June 19, 1900.

Application filed February 5, 1900. Serial No. 4,064. (No model.)

*To all whom it may concern:*

Be it known that I, GEORGE BALLETT FLETCHER, a subject of the Queen of Great Britain, residing at No. 12 Great St. Helen's, in the city of London, England, have invented new and useful Improvements in Spring-Wheels for Velocipedes, Carriages, and other Vehicles, of which the following is a specification.

My invention relates to wheels of the kind wherein the hub or boss is capable of slight movement relatively with the tire or felly, the objects of my invention being to simplify the construction and increase the efficiency of this class of wheel.

According to my invention the spokes are of spring metal and bent to a semicircular or C shape, so that as each spoke comes beneath the hub the weight upon the same will have a tendency to increase the curvature of such spring-spoke, and at the same time the tension upon the diametrically-opposite spoke above the hub will tend to straighten such spoke.

In order to give lateral rigidity to the wheel, I prefer that the spokes should be attached to two flanges upon the hub and that the spokes attached to one flange should be curved in an opposite direction to those attached to the other flange.

Any suitable means may be provided for uniting the spokes to the hub and rim. In practice, however, I find it advantageous in the case of the hub to provide dovetailed sockets, into which the ends of the said spokes can be introduced, the flanges of the hub being made with detachable side plates, the removal of which permits the ready introduction and removal of the spokes into and from the said sockets in a lateral direction.

To enable the invention to be fully understood, I will describe it by reference to the accompanying drawings, in which—

Figure 1 is a side elevation of a portion of a spring-wheel constructed according to the invention. Fig. 2 is a sectional end elevation of the hub. Fig. 3 is a vertical section on the line 3 3, Fig. 2. Fig. 4 is an elevation of a portion of the rim and tire, showing the method of securing the spokes to the rim. Fig. 5 is a section on the line 5 5, Fig. 4. Fig. 6 is a side elevation of a portion of the rim, showing the socket arrangement for the spoke. Fig. 7 is a transverse section showing the socket in end elevation. Fig. 8 is an elevation of the rim end of the spoke. Fig. 9 is a plan thereof. Fig. 10 is a view similar to Fig. 4, showing a modified form of spoke connection. Fig. 11 is a transverse section on the line 11 11, Fig. 10. Fig. 12 is an under side view of the rim shown in Fig. 10; and Figs. 13, 14, and 15 are a side elevation, an end view, and a plan of the modified construction of spoke end. Figs. 2 and 3 are drawn to a larger scale than Fig. 1 and Figs 4 to 15 to a larger scale than Figs. 2 and 3.

$a$ is the tire of the wheel, $b$ the rim thereof, and $c$ the hub.

$d\ d$ are my spring-spokes, which, as clearly shown in Fig. 1, are bent to a semicircular or C shape and are secured at their two ends to the inside of the rim $b$ and to lateral flanges $c'\ c'$ upon the hub $c$, the spokes secured to one flange being curved in the opposite direction to those upon the other flange, as clearly shown in Fig. 1.

As above mentioned, any suitable means may be employed for securing the ends of the spokes $d$ to the flanges $c'$ of the hub $c$.

Figs. 1, 2, and 3 of the drawings show a suitable mode of detachably securing the spokes to the said hub-flanges $c'$—that is to say, the spokes $d\ d$ are formed with flat wedge-shaped or dovetailed inner ends $d'$, the said ends being adapted to take into similarly-shaped recesses $e\ e$, formed in the flanges $c'$ on the hub $c$, the said wedge-shaped spoke ends $d'$ being retained in position in these recesses $e$ by the retaining-plates $f f$, which are secured to the flanges $c'$ by suitable means, such as by the bolts and nuts $f'\ f'$.

A suitable mode of securing the spokes to the rim is illustrated in Figs. 1, 4, 5, 6, 7, 8, and 9. In this arrangement socket-pieces are riveted or otherwise suitably secured to the inner periphery of the rim $b$, the said socket-pieces consisting of the curved plates $g\ g$, upon the under side of each of which is formed or secured a tubular socket $g'$, one end of which is fully opened, while the other end is partially closed, leaving an elongated or flattened opening or slot $g^2$. The spoke end is made with a cylindrical portion $h$ of a size to fit the tubular socket $g'$ and upon the end of this cylindrical portion $h$ there is formed a flat T-head $i$, having a neck $i'$, the tongue being of such a thickness that it can just pass through the flattened slot or opening $g^2$ in the end of the socket $g'$, and the length of the neck being about equal to the thickness of the metal partially closing the end of the said socket. With this arrangement by turning the spoke $d$ so that the T-head $i$ is in the same plane as the slot $g^2$ the said head can be passed through the slot and the spoke turned into the position indicated in Figs. 1, 4, and 5, the neck $i$ then holding the spoke securely in the socket $g'$.

In the arrangement illustrated in Figs. 10 to 15 the socket-pieces are dispensed with and in lieu thereof holes $j$ are formed in the rim. The ends of the spokes in this case are made similarly to those above described, with the exception that the cylindrical portions $h$ are done away with. The width of the head $i$ is about equal to that of the holes $j$, so that by twisting the spoke $d$ at right angles to its normal position the said heads can be passed into the holes. By then turning the spoke into its normal position the head $i$ securely holds it in the rim $b$. Projections $k$, formed upon the spoke, bear against one end of the hole $j$, while the head $i$ bears against the other end thereof, thus preventing the head moving in the hole. With this construction the tire $a$ must be formed with an inner peripheral groove or recess $a'$ to receive the said transverse heads.

Having now particularly described and ascertained the nature of my said invention and in what manner the same is to be performed, I declare that what I claim is—

1. In a spring-wheel, the combination with the rim provided with slotted portions, of a hub provided with dovetailed recesses and semicircular spokes having T-shaped heads at one end adapted to engage said slotted portions, and at the other end having dovetailed portions adapted to engage said dovetailed recesses in said hub, substantially as described.

2. In a spring-wheel, the combination with the rim provided with slotted portions, of a hub having its lateral faces provided with dovetailed recesses, semicircular spokes each provided at one end with a T-head engaging one of the said slotted portions of the rim, and provided at its other end with a dovetailed portion engaging one of the dovetailed recesses in said hub, and retaining-plates secured to the lateral faces of said hub, for retaining the spokes in said recesses, substantially as described.

3. In a spring-wheel, the combination with the rim, of slotted sockets secured to said rim, a hub provided with dovetailed recesses, semicircular spokes having T-shaped heads at one end adapted to engage said slotted sockets and provided at the other end with dovetailed portions adapted to engage said dovetailed recesses in said hub, substantially as described.

GEORGE BALLETT FLETCHER.

Witnesses:
C. G. REDFERN,
F. W. PRICE.